MISSING PAGE TEMPORARY NOTICE

PATENT # 7661X FOR ISSUE DATE 7-5-1833 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Drawings

7661X

UNITED STATES PATENT OFFICE.

CALVIN DELANO, OF LIVERMORE, MAINE.

IMPROVEMENT IN PLOWS.

Specification forming part of Letters Patent dated July 5, 1833.

*To all whom it may concern:*

Be it known that I, CALVIN DELANO, of Livermore, in the county of Oxford and State of Maine, have invented a new and useful Improvement in the Art of Plowing—viz., a Reversing Side-Hill Plow; and I do hereby declare that the following is a full and exact description of the construction and operation of said machine as invented or improved by me.

There are two shares, each eighteen inches long and sixteen inches wide, with sockets made in the hind ends to receive the chips. The chips are two feet long each, the ends of which must be put six inches into the sockets prepared in the shares. The chips and shares are opposite each other. There is one colter, one end put into one share and the other end into the other share. The wings of the shares are facing each other, and are placed sixteen inches apart. The chips are put two feet apart at the hindermost ends, and are connected together by two posts, one at the hind end and the other near the sockets of the shares. A stay or square piece of timber is put about twelve inches behind the wings of said shares and about fifteen inches from the hind post, supported by two rounds put into said stay and post. One end of the mold or furrow board is made fast to the forward post and fitted to each share. The other end is made fast to the stay, the center of said mold-board running by the stay six or eight inches. It commences and continues swelling from the stay to the end sufficient to turn the furrow. The said mold-board may be made in one or more pieces. The beam is about five feet long and four inches square at the center or middle, is straight on the inside, and diminishes on the other sides to the ends. The said beam is put on the landside of the plow, one end hung at the center of the hind post on a bolt put through the beam-post and handle, secured by a nut and also by a knee made fast to the beam, which goes on the forward post so as to slip. There is a clasp made fast to the beam and made to go round the colter, so that the beam will slip from one share to the other.

The handles are about three feet long, hung at the hind end of the plow, one hung at the center of the mold-board, near the hind end, with a hinge, the other at the center of the hind post on a bolt that is put through the beam and post. The said handles are made fast together by two or more rounds, and hook up to the hind ends of the chips in staples there fixed. Said handles are made stationary and firm at pleasure by two stay-braces, which are hung by hinges to the upper round connecting said handles, and at the other end unite in a triangular form, terminating nearly in a point, having two bolts or hooks, one on each side of said point, for the purpose of fastening it in the aforesaid staples. The beam, when plowing, is slipped up to the share, which receives the chip the handles hook onto. In order to go back, unhook the handles, turn the plow over, and hook the handles to the other chip. When the team pulls, the beam will slip up to the other share.

The plow is designed for the purpose of plowing on the sides of hills, and for that purpose is particularly useful.

In operating, a furrow is first plowed at the foot or base of the hill. When the team is going back (returning) another furrow is plowed, turning the furrow all the time downhill. Said plow will also turn well on level ground.

The dimensions given are for a common breaking-up plow. With this plow a team will break up as much ground on the side of a hill as it will upon level land with the common plow in the same time.

CALVIN DELANO.

Witnesses:

ISRAEL WASHBURN, Jr.,
REED WASHBURN.